United States Patent [19]
Ikeda et al.

[11] Patent Number: 4,995,022
[45] Date of Patent: Feb. 19, 1991

[54] POWER SUPPLY DEVICE FOR HAND WITH LUMINESCENCE ELEMENT

[75] Inventors: Hidetsugu Ikeda; Shoichiro Kumazawa; Satoru Yamauchi; Isato Watanabe; Kouichi Miyagi, all of Tokyo, Japan

[73] Assignee: Seikosha Co., Ltd., Japan

[21] Appl. No.: 407,408

[22] Filed: Sep. 14, 1989

[30] Foreign Application Priority Data

Sep. 19, 1988 [JP] Japan .................................. 63-233974
Oct. 31, 1988 [JP] Japan ........................... 63-142182[U]

[51] Int. Cl.⁵ ........................ G04B 19/32; G04B 19/04
[52] U.S. Cl. ...................................... 368/226; 368/228
[58] Field of Search ................... 368/76, 80, 223, 226, 368/228, 238

[56] References Cited

U.S. PATENT DOCUMENTS 1,413,971  4/1922  Cuntz ................................... 368/226
1,415,158  5/1922  Cuntz ................................... 368/226
3,079,748  3/1963  Hultquist ............................. 368/226

FOREIGN PATENT DOCUMENTS 49-68752  3/1974  Japan .
56-9083   1/1981  Japan .

Primary Examiner—Vit W. Miska
Attorney, Agent, or Firm—Bruce L. Adams; Van C. Wilks

[57] ABSTRACT

A power supply device for a hand with a luminescence element which is adapted to supply electric power to the luminescence element mounted on the hand.

10 Claims, 4 Drawing Sheets

POWER SUPPLY DEVICE FOR HAND WITH LUMINESCENCE ELEMENT

BACKGROUND OF THE INVENTION

This invention relates to a power supply device for a hand with a luminescence element which is adapted to supply electric power to the luminescence element mounted on the hand.

In the prior art, Japanese Patent Application Laid-Open No. 49-68752 discloses a clock which includes a luminescence element mounted on a time display hand and a power supply device provided in a central portion of rotation of the display hand for supplying power to the luminescence element. This power supply device is configured so that two lead wires connected with a luminescence diode mounted on the display hand are extended individually to two conductor discs mounted on a rotary shaft of the display hand, and fixed slide members are adapted to slide individually on the conductor discs.

Further, Japanese Utility Model Application Laid-Open No. 56-9083 discloses a configuration in which each of hour and minute hand pipes has two contact members mounted on the periphery thereof, and two contact members connected to a luminescence element mounted on each of hour and minute hands are adapted to connect with the corresponding contact members mounted on the periphery of the corresponding pipe.

According to the foregoing first prior art, although the disclosed idea can be implemented when power is to be supplied to one display hand, it needs an ample space in the axial direction where power is to be supplied to a plurality of hands such as those of the clock, thereby making the implementation difficult.

According to the foregoing second prior art, with an increasing number of hands to be supplied with power, the contact members mounted on the periphery of each pipe become like an increasing number of concentric layers, thereby the diameter of a central shaft portion is extended and the configuration becomes complicated. Further, since those contact members are extended from the inside of a timepiece movement, the conventional timepiece movement itself cannot be used, with the result being that the design itself of the timepiece movement must be changed.

Therefore, it is an object of the present invention to provide a power supply device for a hand with a luminescence element using a simplified configuration, where electric power can be successively supplied to one hand and to other hands disposed in an upper space of the one hand in superposed relation.

SUMMARY OF THE INVENTION

It is another object of the present invention to provide a power supply device for a hand with a luminescence element which can readily supply power to hands without increasing the diameter of a central shaft portion and without changing the configuration of a movement itself.

It is still another object of the present invention to make it possible to attach a contact receiver and contact members accurately and readily.

To achieve the foregoing objects, a power supply device for a hand with a luminescence element according to the present invention comprises a contact receiver secured on the upper side of the hand which has two annular conductors provided on the upper side thereof concentrically about the center of rotation of the hand, a pair of contact members for supplying a drive power to the luminescence element mounted on the hand provided on the under side of the hand and having contact segments whose paths of travel define concentric circles about the center of rotation of the hand, and the annular conductors being connected electrically with the contact members.

The luminescence element mounted on the hands is made of an electroluminescence element.

The pair of contact members is mounted on a hand with an insulating plate interposed therebetween.

The power supply device for a hand with a luminescence element according to the present invention further includes two fixed annular conductors concentrically provided below the hand on which the contact segments of the paired contact members can slide individually, each of the fixed annular conductors having a lead wire for connection with a drive circuit.

The power supply device for a hand with a luminescence element according to the present invention further includes another hand provided above the hand thereof which has a pair of contact members secured thereon each having contact segments slidable on the corresponding one of the two annular conductors.

The power supply device for a hand with a luminescence element according to the present invention further has positioning projections provided on the under side of the contact receiver which are fitable in holes opposingly bored in the hand and the insulating plate.

BRIEF DESCRIPTION OF THE DRAWINGS

The drawings show an embodiment of the present invention, in which.

DETAILED DESCRIPTION OF INVENTION

An embodiment of the present invention will now be described with reference to the drawings.

Figure 1:
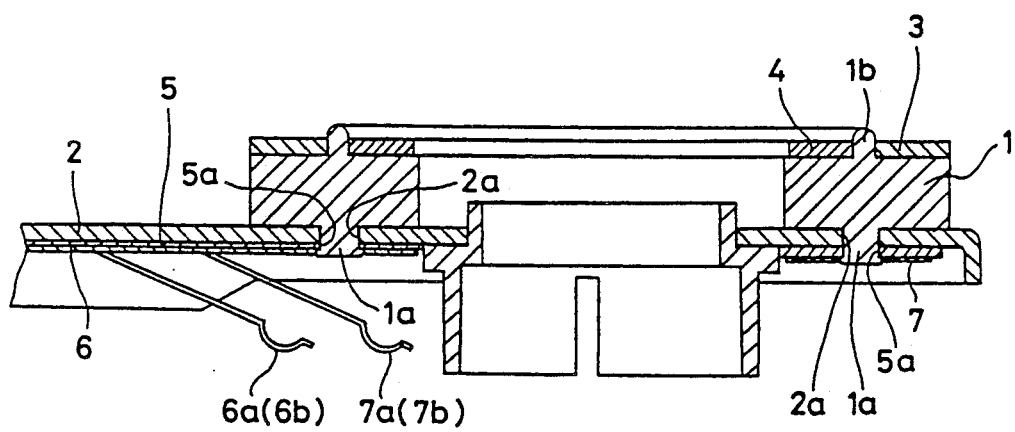
FIG. 1 is an enlarged sectional side view of an important portion.
Figure 2:
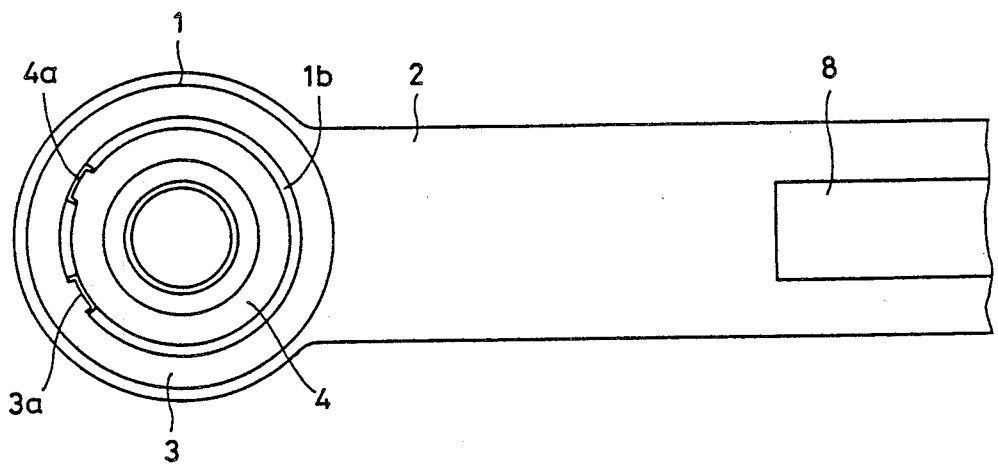
FIG. 2 is a plan view.
Figure 3:
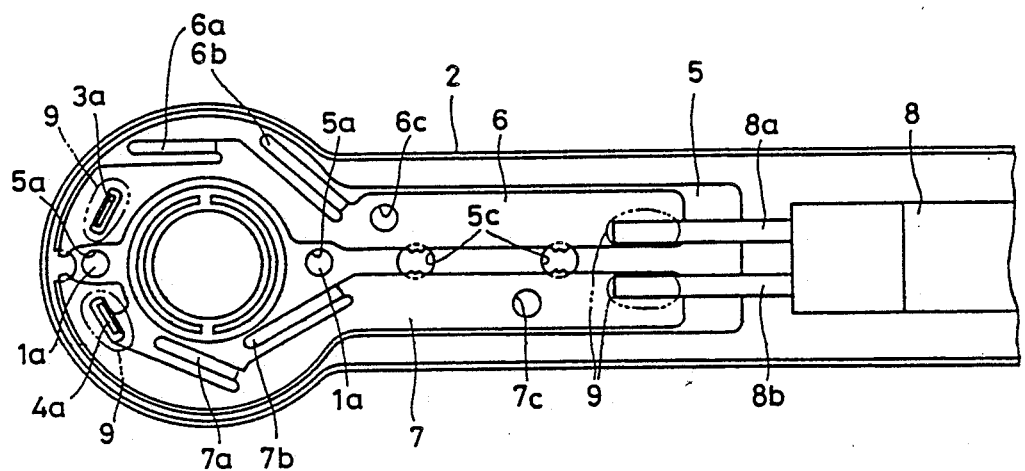
FIG. 3 is a bottom view.

As shown in FIGS. 1 through 3, a contact receiver 1 made of an insulating material has downwardly-extending projections 1a provided on the under side thereof. Holes 2a are bored in a hand 2 opposite to the projections 1a of the contact receiver 1. The contact receiver 1 is secured on a hub portion of the hand 2 with the projections 1a passing through the holes 2a and projecting from the under side of the hand 2. An annular protrusion 1b is provided on the upper side of the contact receiver 1 concentrically with the center of rotation of the hand 2, and two annular conductors 3 and 4 are disposed on the outer and inner sides of this protrusion 1b. Each of the annular conductors 3 and 4 has an L-shaped connecting member 3a, 4a formed in a portion thereof, each of these connecting members passing through the contact receiver 1 and projecting from the under side of the hand 2.

A pair of contact members 6 and 7 is secured on an insulating plate 5. This insulating plate 5 has holes 5a bored opposite to the projections 1a of the contact receiver 1 projecting from the under side of the hand 2. The insulating plate 5 is secured on the under side of the hand 2 with the projections 1a passing through the holes 5a. The distal ends of the projections 1a, whose portions project from the under side of the insulating plate 5, are fused to prevent their detaching. In this way, the contact members 6 and 7 are attached to the under side of the hand 2.

The contact members 6 and 7 supply a drive power to a luminescence element 8, such as an electroluminescence element mounted on a hand portion of the hand 2, and have respectively contact segments 6a and 6b, and 7a and 7b.

These contact segments 6a and 6b, and 7a and 7b are formed so that their travel traces define concentric circles with the center of rotation of the hand 2.

The two annular conductors 3 and 4 are connected electrically with the pair of contact members 6 and 7. The connecting member 3a of the annular conductor 3 is secured and connected to the contact member 6 and the connecting member 4a of the annular conductor 4 to the contact member 7 by solder 9. Further, one lead electrode 8a of the electroluminescence element 8 is secured and connected to the contact member 6 and the other lead electrode 8b to the contact member 7 by solder 9.

An assembly process of the hand 2 with the luminescence element will now be described.

Figure 4:
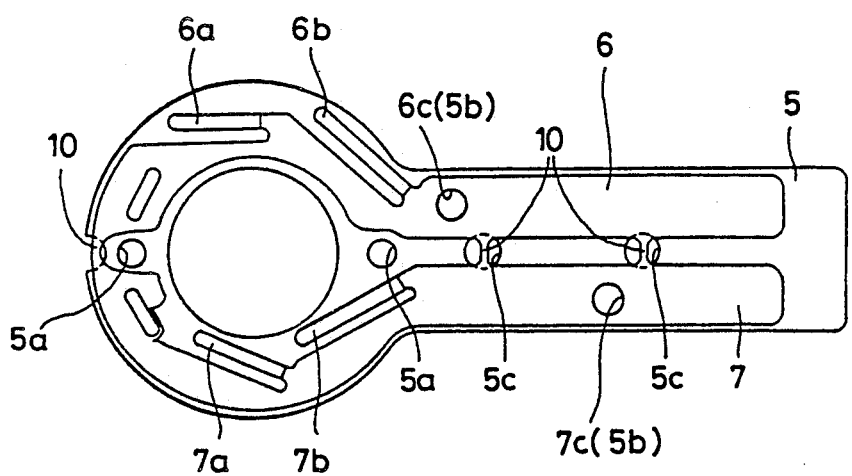
FIG. 4 is a plan view showing a relationship between a contact member and an insulating plate under assembly.

As shown in FIG. 4, the insulating plate 5 has the holes 5a, 5b and disconnection-purpose holes 5c bored therein. The contact members 6 and 7 are formed integrally together by a coupling member 10 and have holes 6c and 7c bored therein. With the holes 5b and the holes 6c and 7c overlapping each other in which projection portions (not shown) of an assembly jig or the like are fitted, the contact members 6 and 7 are bonded to the insulating plate 5. Then, the coupling member 10 is disconnected by the use of a punch or the like adapted to pass through the hole 5c. In this way, the contact members 6 and 7 can be readily secured to proper positions of the insulating plate 5 without deformation.

Then, with the projections 1a of the contact receiver 1 passing through the holes 2a of the hand 2 and through the holes 5a of the insulating plate 5, the contact receiver 1 and the insulating plate 5 are secured to the hand 2. In this way the projections 1a are fused to the under side of the insulating plate 5. In this way, the contact members 6 and 7 and the contact receiver 1 are attached to proper positions of the hand 2.

Figure 5:
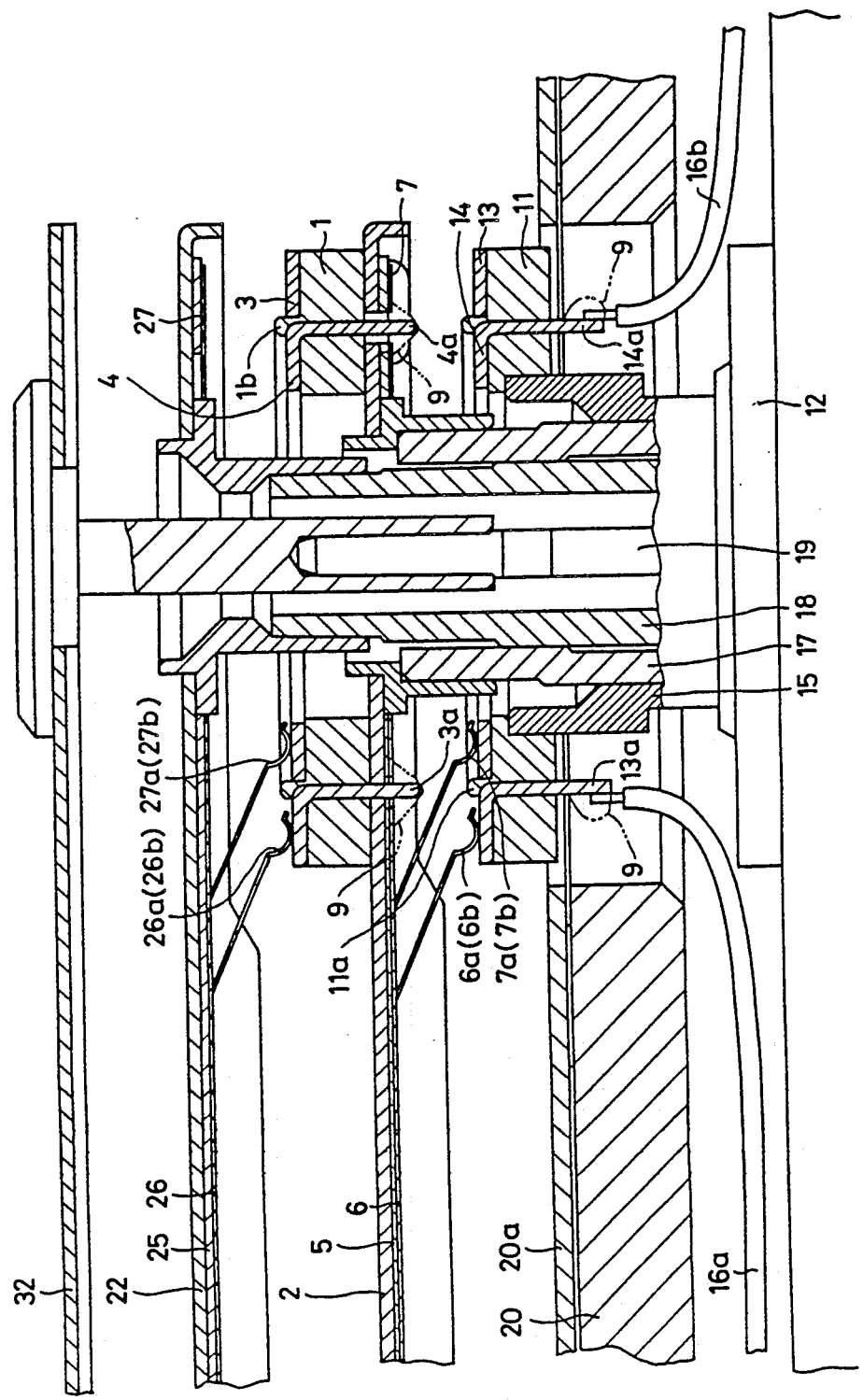
FIG. 5 is a sectional view of an important portion assembled.

FIG. 5 is a sectional view of the above-described power supply device for the hand 2 with the luminescence element. Here, the foregoing hand 2 is used as an hour hand.

A fixed contact receiver 11 is press-fitted with an upper end portion of a bush 15 secured on a timepiece movement 12. The upper side of the fixed contact receiver 11 has fixed annular conductors 13 and 14 disposed on the outer and inner sides of a protrusion 11a, and connecting members 13a and 14a projecting from the under side of the fixed contact receiver 11 are connected with lead wires 16a and 16b for connection with a drive circuit not shown. Disposed above the fixed contact receiver 11 are an hour hand shaft 17, a minute hand shaft 18, and a second hand shaft 19 passing through the bush 15, to which an hour hand 2, a minute hand 22, and a second hand 32 are secured, respectively. The hour hand 2, minute hand 22 and second hand 32 are rotatable over a dial 20a fixed to a dial receiver 20.

A pair of contact members 26 and 27 identical in configuration with the contact members 6 and 7 provided on the under side of the hour hand 2 is secured on the under side of the minute hand 22 with an insulating plate 25 interposed therebetween. The contact members 26 and 27 are for supplying a drive power to a luminescence element such as an electroluminescence element mounted on the minute hand 22, and their contact segments 26a and 26b, and 27a and 27b are slidable on the annular conductors 3 and 4 of the hour hand 2.

With the foregoing configuration, if power is supplied from the drive circuit while the hour hand 2, minute hand 22 and second hand 32 are rotating at their respective rotational speeds under the driving of the timepiece movement 12, thereby indicating "time", the power is conducted from the lead wire 16a to the fixed annular conductor 13, to the contact member 6 via the contact segments 6a and 6b sliding on this fixed conductor, and to the one lead electrode 8a of the luminescence element 8, and at the same time, from the lead wire 16b to the fixed annular conductor 14, to the contact member 7 via the contact segments 7a and 7b sliding on this fixed conductor, and to the other lead electrode 8b of the luminescence element 8, whereby the power is supplied to the luminescence element 3 of the hour hand 2.

Similarly, the power is conducted from the contact member 7 to one lead electrode of the luminescence element of the minute hand 22 via the annular conductor 4 and the contact member 27, and from the contact member 6 to the other lead electrode of the luminescence element of the minute hand 22 via the annular conductor 3 and the contact member 26, whereby the power is supplied to the luminescence element of the minute hand 22. Since the two contact segments 6a and 6b, and the contact segments 26a and 26b, and 27a and 27b are adapted to slide on the fixed conductors 13 and 14 and the conductors 3 and 4, respectively, it is possible to enhance the reliability of conduction by changing the spring pressure, spring height, spring length, sliding radius, etc. of each component. Further, the protrusions 1b and 11a provided on the contact receivers 1 and 11 prevent the contact segments from contacting with the opposite conductor or fixed conductor even when they deviate a little from their sliding routes.

As described above, according to the present invention, the power supplied from a lower portion is used to drive the luminescence element mounted on the subject hand and at the same time, it is further conducted to the hand disposed at a higher position, that is, the power is successively supplied to a number of hands disposed in superposed relation at the same axial position to drive loads mounted on the individual hands.

According to the present invention, using a simplified configuration, it is possible to drive a luminescence element of one hand by a power supplied thereto and concurrently, to successively supply the same power to the other hands superposed on that one hand.

A luminous hand is readily embodied by driving an electroluminescence element acting as a load; thus, there can be provided luminous hands emitting various colors of light.

Providing contact members on a hand with the insulating plate interposed therebetween prevents deformations of the contact members at a time of assembly, thereby improving a positional accuracy and enhancing an insulation effect.

Further, the power can be readily supplied to the hands using the simplified configuration without increasing a diameter of a central shaft portion and without changing the configuration of the movement itself. Further, by supplying the power to the hands, a novel function such as of illuminating the hands can be readily added.

Further, since positioning projections are provided on the under side of the contact receiver and holes are bored in the hand and the insulating plate opposingly to the projections, the contact receiver and the contact members can be readily attached to proper positions of the hand, whereby contact segments can slide on annular conductors accurately.

What is claimed is:

1. A power supply device for a hand with a luminescence element comprising:
   a contact receiver secured on the upper side of the hand and having two annular conductors on the upper side thereof concentrically with the center of rotation of the hand, and
   a pair of contact members for supplying a drive power to the luminescence element mounted on the hand, the contact members being disposed on the under side of the hand and having contact segments whose paths of travel define concentric circles with the center of rotation of the hand,
   wherein the annular conductors are connected electrically with the contact members.

2. A power supply device for a hand with a luminescence element according to claim 1, wherein the luminescence element is an electroluminescence element.

3. A power supply device for a hand with a luminescence element according to claim 1, wherein the pair of contact members is mounted on the hand with an insulating plate interposed therebetween.

4. A power supply device for a hand with a luminescence element according to claim 1, further including two fixed annular conductors concentrically provided below the hand and on which the contact segments of the respective contact members can slide individually, each of the fixed annular conductors having a lead wire for connection with a drive circuit.

5. A power supply device for a hand with a luminescence element according to claim 4, further including another hand disposed above the first hand and having a pair of contact members secured thereon, each contact member having contact segments slidable on one of the two annular conductors.

6. A power supply device for a hand with a luminescence element according to claim 3, wherein the contact receiver has positioning projections provided on the under side thereof which are fitable in holes opposingly bored in the hand and the insulating plate.

7. A hand having a luminescent element for use with a timepiece, comprising: a rotary hand having obverse and reverse sides and having a hub portion and a hand portion extending outwardly from the hub portion; an energizeable luminescent element disposed on the hand portion; two annular conductors concentrically disposed on the obverse side of the hand hub portion and being electrically insulated from the hub portion; and two contact members disposed on the reverse side of the hand and electrically connected to the luminescent element and electrically connected to respective ones of the annular conductors, the contact members each having at least one contact segment positioned to define a circular path of travel in response to rotation of the hand for supplying electrical energy to the luminescent element.

8. A hand according to claim 7, wherein the two contact members extend in side-by-side spaced relation from each other from the hub portion along the hand portion.

9. A hand according to claim 7, including an insulating plate interposed between the contact members and the hand.

10. A hand according to claim 7, including an annular insulating member interposed between the annular conductors and the hand and on which the annular conductors are mounted.

* * * * *